United States Patent

Buferne

[11] Patent Number: 4,899,703
[45] Date of Patent: Feb. 13, 1990

[54] DEVICE FOR FASTENING A FIRST PART SUCH AS AN ACCESSORY TO A SECOND PART SUCH AS A SUPPORT WITH A BUSH FOR ELIMINATING THE ASSEMBLING BACKLASH BETWEEN THE TWO PARTS AND BUSH USED FOR THE FASTENING OF THESE PARTS

[75] Inventor: Pierre Buferne, Le Port Marly, France

[73] Assignees: Automobiles Peugeot, Paris; Automobiles Citroen, Neuilly sur Seine, both of France

[21] Appl. No.: 271,679

[22] Filed: Nov. 16, 1988

[30] Foreign Application Priority Data

Dec. 7, 1987 [FR] France ................... 87 16987

[51] Int. Cl.⁴ .................. F02F 7/00; F46H 7/08; F16M 1/00
[52] U.S. Cl. .................. 123/195 A; 123/198 R; 248/674; 474/101; 417/360
[58] Field of Search .......... 123/195 R, 195 A, 198 R, 123/198 E, 560, 565, 65 B, 65 BA; 474/101; 248/65, 73, 281.1, 642, 674; 417/360, 364

[56] References Cited

U.S. PATENT DOCUMENTS

| 1,440,576 | 1/1923 | Astrom . |
| 3,730,147 | 5/1973 | Buchwald ................... 123/195 A |
| 4,600,367 | 7/1986 | Terauchi et al. ................ 417/360 |
| 4,633,828 | 1/1987 | Steele ........................... 123/198 R |
| 4,834,336 | 5/1989 | Shimazaki et al. ................ 248/635 |

FOREIGN PATENT DOCUMENTS

| 0113859 | 7/1984 | European Pat. Off. . |
| 2136832 | 2/1973 | Fed. Rep. of Germany . |
| 3245770 | 6/1984 | Fed. Rep. of Germany . |
| 3524309 | 1/1987 | Fed. Rep. of Germany . |

Primary Examiner—David A. Okonsky
Attorney, Agent, or Firm—Kenyon & Kenyon

[57] ABSTRACT

The present invention relates to a device for fastening a first part to a second part, the two parts having an assembling backlash between them, this device comprising a bush with inner and outer threads with opposite pitches, interposed between the threads of a fastening screw and an inside thread of the second part matching with the outer thread of the bush.

6 Claims, 2 Drawing Sheets

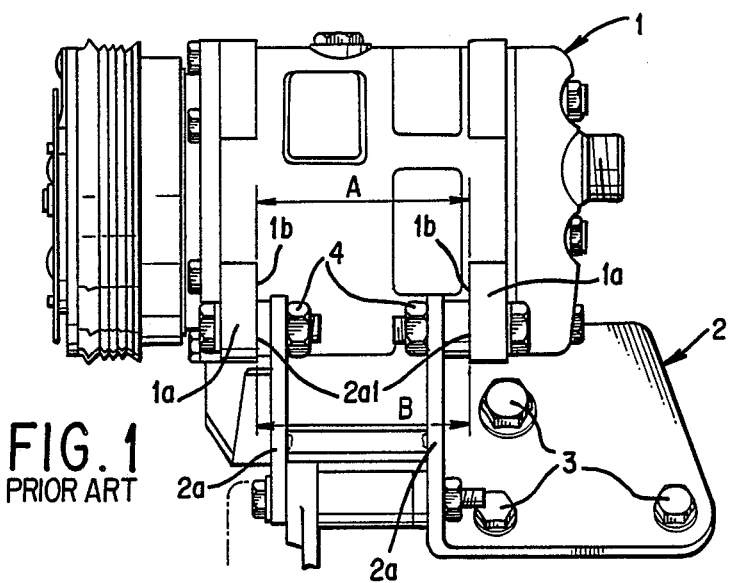
FIG. 1
PRIOR ART
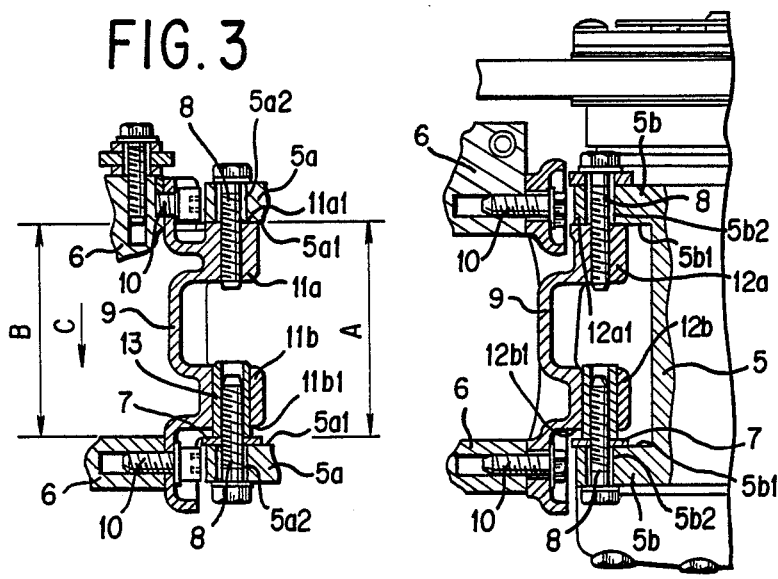
FIG. 3
FIG. 4

DEVICE FOR FASTENING A FIRST PART SUCH AS AN ACCESSORY TO A SECOND PART SUCH AS A SUPPORT WITH A BUSH FOR ELIMINATING THE ASSEMBLING BACKLASH BETWEEN THE TWO PARTS AND BUSH USED FOR THE FASTENING OF THESE PARTS

The present invention relates to a device for fastening a mechanical part to another mechanical part with an assembling backlash between them.

Such a device can be used in particular for the fastening of accessories such as refrigeration compressors, alternators, hydraulic pumps or crankcases for thermal engines of automotive vehicles.

FIG. 1 shows a known embodiment for fastening a refrigeration compressor 1 of a thermal engine to a crankcase of same. The known fastening device comprises two parallel fastening flanges or lugs 1a solid with compressor 1 and comprising respectively two parallel inner bearing faces 1b facing one another by a distance or dimension A. Moreover, the fastening device comprises a support 2 assembled by welding, solid with the crankcase (not shown) by fastening screws 3 and comprising two parallel rigid support plates 2a presenting two substantially parallel opposite outer bearing faces 2a1 separated from each other by a distance or dimension B. For reasons of assembling the support plates 2a between flanges 1a, the dimension A between the flanges 1a of compressor 1 is necessarily greater than the dimension B between the outer faces 2a1 respectively of the two support plates 2a. The two flanges 1a are fastened respectively to the two support plates 2a with the aid of coaxial fastening bolts 4 ensuring a strong clamping of the inner bearing faces 1b respectively against the outer faces 2a1 of the support plates 2a. However, inasmuch as the dimension A shall be greater than the dimension B, the clamping force of the fastening bolts 4 deforms the dimensions A and B to the contact of the clamping flanges 1a with the fastening lugs 2a in order to obtain a positive clamping. Thus, this force stresses the flanges of the compressor and the fastening plates 2a with a risk of fatigue rupture of these parts.

The present invention has for an object to eliminate the above drawback of the known device by providing a device for fastening a first part comprising at least two substantially parallel fastening lugs, respectively with inner bearing faces opposite to each other, to another part with two opposite parallel outer faces disposed between both bearing faces of the fastening lugs with an assembling backlash, and comprising at least two screws for the fastening respectively of the two fastening lugs to the second part and characterized in that it comprises a bush with inner and outer threads with opposite pitches interposed between the threads of one of the fastening screws and an inside thread of the second part matching with the outer thread of the bush, the inner thread of the bush matching with the thread of the screw with a reduced backlash in order that the bush can move axially in the inside thread during the operation of tightening of the fastening screw so as to abut one of its two free ends against the inner bearing face of the fastening lug through which the said fastening screw passes.

According to a feature of the invention, the bush comprises a drive configuration, such as a slot, for the positioning thereof, before assembling the first part to the second part, in the inside thread of the second part so that the aforesaid free end of the bush be substantially level with the aperture of the inside thread opening onto the outer face of the second part opposite to the aforesaid bearing face of the fastening lug.

According to still another feature of the invention, the second fastening screw is in coaxial relationship with the first fastening screw and holds firmly the other outer face of the second part against the bearing face of the second fastening lug during its tightening.

The invention relates also to a bush used in particular for the fastening of a first part, such as an accessory, to a second part, such as a support, the two parts having between them an assembling backlash and characterized in that it comprises inner and outer threads with opposite pitches, the inner thread of the bush being machined so as to have a reduced backlash with the corresponding thread of a screw for fastening the first part to the second part.

According to a feature of the invention, the bush comprises, at one of its two free ends, a drive configuration, such as a slot, for its positioning in an inside thread of the second part.

The invention will be better understood and other objects, features, details and advantages thereof will appear more clearly from the following explanatory description with reference to the appended diagrammatic drawings given by way of example only illustrating an embodiment of the invention and wherein:

FIG. 1 shows a known device for fastening a refrigeration compressor to the crankcase of a thermal engine;

FIG. 3 is a cross-sectional view along line III—III of FIG. 2;

FIG. 4 is a cross-sectional view along line IV—IV of FIG. 2; and

The fastening device according to the invention will be described when used for the fastening of a refrigeration compressor to the crankcase of a thermal engine of an automotive vehicle, although this device can of course be used for the fastening of other various accessories such as for example alternators, hydraulic pumps of thermal engines.

Figure 2:
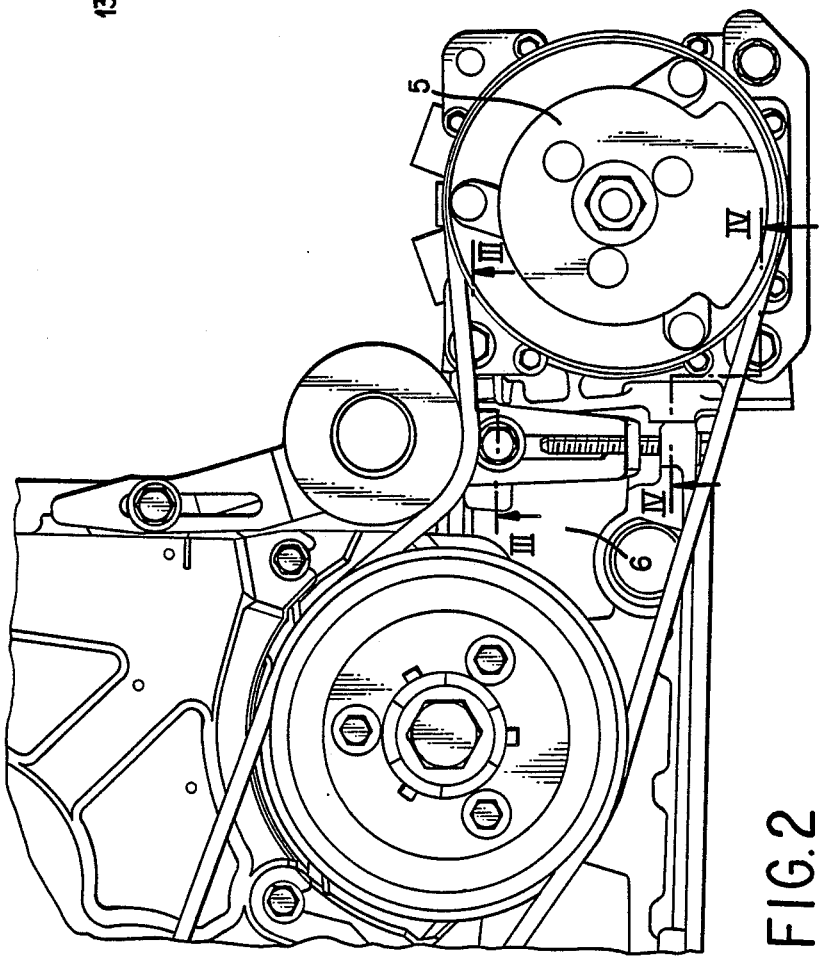
FIG. 2 shows the device for fastening a refrigeration compressor to the crankcase of a thermal engine according to the invention.

As shown in FIGS. 2 to 4, the reference sign 5 designates a refrigeration compressor of a thermal engine rigidly fastened to the crankcase 6 of a thermal engine of an automotive vehicle.

The compressor 5 comprises two pairs of fastening lugs 5a, 5b solid with the same. Both fastening lugs of each pair are substantially parallel and comprise respectively two parallel inner bearing faces 5a1, 5b1 opposite to each other, one of the bearing faces comprising a bearing plate under the shape of a washer 7 which is solid for example through welding with the bearing face. The bearing face 5a1; 5b1 of each pair of fastening lugs is separated from the inner bearing face of the bearing plate 7 by a dimension A. The two fastening lugs of each pair comprise respectively two coaxial through holes 5a2; 5b2 which permit screws 8 for fastening compressor 5 to crankcase 6 to pass therethrough, the heads of the fastening screws 8, when tightened, resting respectively on the outer faces of the fastening lugs 5 opposite to the bearing faces 5a1; 5b1.

The fastening lugs 5 are fastened to the crankcase 6 through the medium of a common support 9 which is itself solid with crankcase 6 through the medium of fastening screws 10. The support 9 comprises two pairs of flanges 11a, 11b; 12a, 12b for the fastening respectively of the two pairs of fastening lugs 5a, 5b to the support 9. The two flanges 11a, 11b; 12a, 12b of each pair are substantially parallel and their opposite parallel outer faces 11a1, 11b1; 12a1, 12b1 are separated from each other by a dimension B smaller than the dimension A. The outer faces 11a1 and 12a1 of flanges 11a and 12a respectively are machined whereas the opposite outer faces 11b1 and 12b1 of flanges 11b and 12 respectively are cast in one piece. The two flanges 11a, 11b; 12a, 12b comprise respectively two coaxial threaded holes, the inside thread of the flange 11a or 12a matching with the thread of the associated fastening screw 8.

Figure 5:
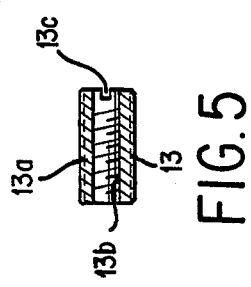
FIG. 5 is an enlarged view of the bush according to the invention.

The fastening device according to the invention comprises a bush 13 shown in FIG. 5 and comprising an outer thread 13a matching with the inside thread of the flange 11b or 12b and an inner thread 13b, made in the through hole of the bush, and matching with the thread of the associated fastening screw 8 with a reduced backlash. The direction of the pitch of the spirals of the inner thread is opposite to that of the pitch of the spiral of the outer thread. For example, the bush 13 has an outer thread 13a of the left-handed type whereas the inner thread 13b is of the right-handed type. Moreover, the bush 13 comprises a drive configuration 13c, such as a slot, for the positioning of the bush in the inside thread of the flange 11b or 12b.

The operation of the fastening device according to the invention follows partly from the above description and will now be described in detail.

First, the bush 13 is positionned, with the aid of a screwdriver inserted in slot 13c, in the inside thread of flange 11b or 12b until the free end of the bush comprising the slot 13c is substantially level with the aperture of the threaded hole of flange 11b or 12b. The fastening lugs 5a or 5b are put in assembling position so that the bores 5a2 or 5b2 and the inside threads of flanges 11a, 11b or 12a, 12b respectively be substantially coaxial. Then, a fastening screw 8 is introduced into the bore 5a2 or 5b2 and is screwed in the inside thread of flange 11a or 12a and tightened until the inner face 11a1 or 12a1 is strongly held in contact against the machined outer face of flange 11a or 12a. In this mounting position, a space corresponding to the assembling backlash equal to the difference between the dimension A and the dimension B remains between the inner face of the bearing plate 7 and the outer face 11b1 or 12b1. Then, another screw 8 is introduced into the bores 5a2 or 5b2 and screwed in the inside thread of the bush 13. The reduced backlash between the inner thread 13b of bush 13 and the thread of this screw 8 ensures a friction of the bush against this screw 8 which permits both the rotation of the bush 13 and the rotation of the screw. The bush 13, which is rotated, moves axially in the inside thread of flange 11b or 12b in the direction of arrow C and abuts at its free end comprising the slot 13c against the inner face of the bearing plate 7 during the definitive tightening of the fastening screw 8. Thus, the axial motion of bush 13 permits suppressing the backlash between the dimensions A and B which renders the dimensions of the faces to be assembled equal without stresses.

Therefore, the bush used in the fastening device of the invention has for an advantage that it lowers the fastening stresses of the fastening lugs of the accessory to be assembled on an engine, due to the interval existing between the bearing faces of the support and the bearing faces of the accessory and resulting from the manufacturing tolerances both of the support and of the accessory. Thus, there is obtained a rigid fastening of the accessory on the support, which suppresses automatically the aforesaid backlash without adjusting wedges and without stresses. Moreover, it is not necessary to machine the face 11b1 or 12b1 located opposite to the bearing face of plate 7.

What is claimed is:

1. A device for fastening a first part comprising at least two substantially parallel fastening lugs, respectively with two inner bearing faces opposite to each other, to a second part with two opposite parallel outer faces disposed between the two bearing faces of the fastening lugs with an assembling backlash, and comprising at least two screws for the fastening respectively of the two fastening lugs to the second part, this device comprising a bush with inner and outer threads with opposite pitches, interposed between the threads of one of the fastening screws and an inside thread of the second part matching with the outer thread of the bush, the inner thread of the bush matching with the thread of the screw with a reduced backlash in order that the bush can move axially in the inside thread during the operation of tightening of the fastening screw so as to abut at one of its two free ends against the inner bearing face of the fastening lug through which the said fastening screw passes.

2. A device according to claim 1, wherein the aforesaid bush comprises a drive configuration, such as a slot, for the positioning thereof, before assembling the first part to the second part, in the inside thread of the second part so that the aforesaid free end of the bush be substantially level with the aperture of the inside thread opening onto the outer face of the second part opposite to the aforesaid bearing face of the fastening lug.

3. A device according to claim 1, wherein the second fastening screw is in coaxial relationship with the first fastening screw and holds firmly the other outer face of the second part against the bearing face of the second fastening lug during the tightening of the second screw.

4. A device according to claim 1, wherein the aforesaid first part is an accessory such as a compressor, an alternator, a hydraulic pump of a thermal engine of an automotive vehicle and wherein the aforesaid second part is a support solid with the crankcase of the engine.

5. A bush used in particular for the fastening of a first part, such as an accessory, to a second part, such as a support, the two parts having between them an assembling backlash, the bush comprising inner and outer threads with opposite pitches, the inner thread of the bush being machined so as to have a reduced backlash with the corresponding thread of a screw for fastening the first part to the second part.

6. A bush according to claim 5, comprising, at one of its two free ends, a drive configuration, such as a slot, for its positioning in an inside thread of the second part.

* * * * *